United States Patent [19]

Melzer et al.

[11] Patent Number: 5,405,579
[45] Date of Patent: Apr. 11, 1995

[54] DECONTAMINATION OF POLLUTED SOILS

[75] Inventors: Reiner Melzer, Stuttgart; Klaus Mikulla, Geretsried, both of Germany

[73] Assignee: Linde Aktiengesellschaft, Wiesbaden, Germany

[21] Appl. No.: 916,788

[22] Filed: Jul. 22, 1992

[30] Foreign Application Priority Data

Jul. 22, 1991 [DE] Germany .................. 41 24 277.7

[51] Int. Cl.$^6$ ............................................. A61L 2/00
[52] U.S. Cl. .................................. 422/26; 34/135; 34/136; 110/236; 210/774; 422/1; 422/38
[58] Field of Search .............. 422/1, 26, 38; 34/135, 34/136; 210/634, 774, 747; 110/236, 246, 226; 405/128; 55/222, 223, 228, 259

[56] References Cited

U.S. PATENT DOCUMENTS

| | | | |
|---|---|---|---|
| 3,444,626 | 5/1969 | Burton | 34/135 |
| 3,755,990 | 9/1973 | Hardison | 55/259 |
| 4,108,775 | 8/1978 | Wilkes et al. | 210/169 |
| 4,149,859 | 4/1979 | Vigesdal | 55/222 |
| 4,383,838 | 5/1983 | Barten et al. | 55/228 |
| 4,465,573 | 8/1984 | O'Hare | 204/182.4 |
| 4,606,774 | 8/1986 | Morris | 210/774 |
| 4,667,609 | 5/1987 | Hardison et al. | 110/236 |
| 4,708,721 | 11/1987 | Ehrler | 55/222 |
| 4,750,436 | 6/1988 | Maury et al. | 110/236 |
| 4,752,308 | 6/1988 | Brandl et al. | 210/774 |
| 4,827,854 | 5/1989 | Collette | 110/246 |
| 4,864,942 | 9/1989 | Fochtman et al. | 110/226 |
| 4,869,825 | 9/1989 | Steiner | 210/634 |
| 5,078,868 | 1/1992 | Robertson | 110/236 |
| 5,085,581 | 2/1992 | Mendenhall | 110/236 |
| 5,103,578 | 4/1992 | Rickard | 110/236 |
| 5,121,699 | 6/1992 | Frank | 110/236 |
| 5,149,444 | 9/1992 | Hoch | 405/128 |
| 5,154,734 | 10/1992 | Yung | 55/228 |
| 5,176,445 | 1/1993 | Mize | 110/236 |
| 5,176,798 | 1/1993 | Rodden | 210/774 |
| 5,181,796 | 1/1993 | DeYoung | 405/128 |

*Primary Examiner*—W. Gary Jones
*Assistant Examiner*—Laura E. Edwards
*Attorney, Agent, or Firm*—Millen, White, Zelano, & Branigan

[57] ABSTRACT

For the thermal treatment of contaminated soils, excavated soil is heated by indirect heat exchange up to 650° C. in a rotary drum in the absence of oxygen. Pollutants are separated from the soil by a desorption medium. Moisture in the soil vaporized to steam can serve as the desorption medium. The resultant gaseous pollutant stream is condensed, and the pollutants are separated.

11 Claims, 3 Drawing Sheets

DECONTAMINATION OF POLLUTED SOILS

BACKGROUND OF THE INVENTION

This invention relates to the decontamination of polluted soil wherein the soil is excavated and subsequently subjected to a thermal treatment.

Various methods are known for the decontamination of soil tainted with pollutants such as, for example, oil. The pollutants can be removed from the soil with, for example, the aid of a washing agent, e.g., water or a solvent. The resultant contaminated washing agent must, in turn, subsequently be processed by expensive methods, such as sedimentation, flotation, extraction, or distillation, in order to separate the pollutants. Substantial problems also arise in the separation of the washing agent from the soil. Usually, a large residue of contaminated washing agent will always remain in the soil.

Another soil decontamination method resides in the severe heating of the soil with flue gases and subsequent combustion of the pollutant-free gas mixture. However, this process can produce dioxins, thus requiring an expensive flue gas purification system.

SUMMARY OF THE INVENTION

An object of the present invention is to provide an improved process and associated apparatus of the type disclosed herein so that an effective and economical decontamination of the soil can be achieved without the formation of new pollutants.

Upon further study of the specification and appended claims, further objects and advantages of this invention will become apparent to those skilled in the art.

These objects are attained according to the invention by heating the soil by indirect heat exchange to a maximum of 650° C. in the absence of oxygen and separating the soil contaminants from the soil with a desorption medium.

Preferably, superheated steam formed during vaporization of soil moisture serves as the desorption medium. The amount of desorption steam can be increased, if desired, by the direct addition of water to the hot soil. Another alternative for the desorption is to conduct an external desorption medium, for example, an inert gas, through the soil.

The present invention is based on an appreciation of the fact that the decontamination effect of a stripping gas is only partially dependent on the throughput quantity of the stripping gas. This stripping gaseous stream merely results in a lowering of the partial pressure in the pollutants. The decontamination effect is determined to an increased degree by the temperature and residence time. Increasing the residence time of the soil, for example, up to one hour, under elevated temperatures results in a reduction of the required desorption temperature in comparison to short residence times. If the three parameters of stripping gas quantity, temperature, and residence time are adjusted to particular values, the pollutants can be desorbed from the soil at a temperature far below their normal boiling temperatures. Adjustment of these three parameters depends on many variables: the spectrum of pollutants, soil structure, carbon content, organic soil components, and the age of the waste load.

Irrespective of these variables, it has been found that the temperature must not exceed 650° C., and oxygen must be excluded in order to prevent the formation of toxins and cracked gases. This maximum temperature of 650° C. is sufficient to obtain extensive desorption of the pollutants. However, the optimal temperature must be determined on a case-by-case basis by routine experimentation, depending on specific soil conditions. Usually, treatment temperatures range from about 350°–550° C. In certain instances, however, the desired extent of decontamination has been reached, for example, at about 200°C.

Based on the relatively low treatment temperatures in conjunction with exclusion of oxygen, there is no chemical decomposition of the soil ingredients, as occurs with conventional thermal processes. In particular, the formation of even more toxic secondary products of the soil pollutants, such as, for example, dioxins and furans, is reliably prevented. The indirect heating of the soil similarly contributes toward avoiding an array of problems in the treatment of secondary products with direct heating, by means of flue gases, for example, large amounts of gas would be admixed to the gaseous pollutant stream containing the desorbed soil pollutants, requiring an expensive waste gas purification system. Further, with direct heating of the soil by introduction of a hot gas, large amounts of fine dust evolve, also necessitating expensive processing of the waste gas.

The soil is preferably treated under superatmospheric pressure, e.g., preferably not exceeding a value of 2 bars absolute thereof. Due to the increased pressure, the decontamination effect is further enhanced, on the one hand; and, on the other hand, certain advantages accrue with respect to the apparatus. Treatment of the soil suitably takes place in a cylindrical rotary vessel, and the pollutant-laden gas stream produced during desorption of the pollutants is withdrawn from the rotary vessel and subsequently subjected to processing in equipment arranged downstream. Such downstream equipment includes, among others, blowers or compressors, which may become clogged, for example, by solids in the gaseous phase and/or by the precipitation of solids from pollutants at elevated temperatures. Consequently, to compensate for possible pressure loss in the processing section, it is preferable to utilize a superatmospheric pressure in the rotary vessel.

Moreover, diffusion and/or leakage of atmospheric oxygen into the rotary vessel can be prevented by increasing the internal pressure in the rotary vessel. The exclusion of oxygen is particularly important because such exclusion greatly reduces the potential for dioxin formation. As a further precaution, the inlet and discharge ports, as well as the seals of the rotary vessel, can be designed for inert gas purging to prevent oxygen from entering the hot portion of the facility.

Preferably, the soil is treated with the desorption medium for about 0.5–1 hour. If desorption of the soil pollutants is effected in a rotary vessel, the residence time of the soil in the desorption zone of the rotary vessel is set accordingly.

In an especially preferred embodiment of the invention, the soil is preferably treated in a rotary vessel in a single stage, during which soil drying and pollutant desorption occurs. For this purpose, at least the forward portion of the rotary vessel wherein the soil is fed, is heated from the outside to a tube wall temperature of up to 650° C., to vaporize the soil moisture. The resultant hot steam acts as the desorption medium for desorbing pollutants from the soil. The thus-obtained pollutant-laden gas stream is withdrawn from the rotary vessel and delivered for further processing. Before discharge from the rotary vessel, the desorbed soil can be cooled in the rotary vessel, preferably by the introduction of liquid water or low pressure steam from the gas processing section.

According to another modification of the invention, treatment of the soil takes place in at least two stages, the soil being heated and dried in the first stage and a desorption medium being passed through the soil in the second stage. The soil can be cooled again in an optional third stage.

For this purpose, preferably three rotary vessels are connected in series, i.e., one rotary vessel for soil drying, one for pollutant desorption, and one for soil cooling. To prevent the pollutants from recontaminating the soil during cooling, an inert gas, preferably steam, is conducted countercurrently to the soil to be cooled and then admixed with the pollutant-laden gas stream from the desorption phase.

The heat to be fed to the rotary vessels is applied indirectly. The first rotary vessel is heated from the outside to a tube wall temperature of up to 650° C., during which the soil moisture is vaporized and withdrawn as hot steam. The hot steam is advantageously employed as the desorption medium in the second rotary vessel. If the quantity of steam is insufficient for pollutant stripping, it is possible to externally introduce a supplemental stream of hot purge gas or water into the second rotary vessel. Given the predominantly hydrophilic behavior of the soil, the adsorbed organic pollutants are displaced by $H_2O$ molecules, with improved purification in comparison to other stripping gases.

In cases where strict maintenance of inert conditions is important, the use of an inert gas as the desorption medium is employed. Carbon dioxide or nitrogen, for example, is suitable for this purpose.

Due to the step of drying the soil in the first stage, the subsequent desorption in the second stage is particularly effective. Since the water has been extensively removed from the soil in the first stage, the pollutants remaining in the soil can be more readily desorbed in the second stage.

Since precipitation of solids must be expected, the desorption medium loaded with the soil pollutants is cooled in controlled fashion in a scrubbing step at, for example, 100° C. The scrubbing step is followed by phase separation, wherein many phases are present: fines, i.e., a solid soil phase not retained by cyclones or filters, a solid and liquid phase produced by cooling of the desorbed pollutants, a liquid phase formed from the water removed from the soil and utilized as the desorption agent, and a vapor phase in equilibrium therewith.

To obtain the desired phase separation, the pH value in the aqueous phase must be set correspondingly. The individual phases are then conducted to further controlled, individual treatments.

The gaseous phase obtained after phase separation is further cooled, for example, in an air- or water-cooled heat exchanger. To avert clogging of the heat exchange surfaces of the cooler, precipitation of further solids must be prevented during this step. This can be achieved by dissolving any precipitating solid in a solvent. Typically utilized are organic solvents, which can dissolve the organic solids. For this purpose, a suitable solvent is injected into the gaseous stream.

As mentioned above, dioxin formation does not occur in the process of the present invention because the soil is treated at temperatures which are low in comparison to combustion temperatures. Conversely, even at these relatively low treatment temperatures, highly effective decontamination results are generally obtained with the present process after about one hour of treatment. In particular, pollutants which are otherwise very difficult to separate—polychlorinated biphenyls (PCB) and polycyclic aromatic hydrocarbons (PAH)—are separated to below detectable levels in the process of this invention, whereas these compounds are practically impossible to remove using conventional water-washing processes.

In contrast to the thermal method, the process of this invention does not require any expensive waste air processing. Due to the condensation of the desorption medium and the concomitant volume reduction, a substantially lower quantity of carrier medium, i.e., purge gas or flue gas, is processed in comparison to combustion methods. Further, due to the indirect heating of the soil, an increase in the pollutant gas stream, which otherwise would occur with direct heating, is avoided. Accordingly, the present process is substantially more effective in terms of equipment and costs than conventional thermal treatments.

Problems associated with conventional washing procedures, such as difficult solid-liquid separation and the processing of very large quantities of wash water, are also eliminated in the process of this invention. In addition, the decontaminated soil of this invention is almost completely (in excess of 99%) reused. Dumping expenses, as incurred, for example, in the soil washing processes, are thus avoided.

Another advantage of the present process is that the soil comes into contact solely with auxiliary media that are environmentally harmless so that there is no risk of a dangerous chemical alteration of the pollutants or soil.

The process according to the invention is suitable, in particular, for the decontamination of soils polluted by hydrocarbons, such as, for example, oil-contaminated ground. Also, PCB- and PAH-containing soils can be effectively decontaminated by the present process, which process, moreover, is suitable for decontaminating polluted industrial sites fouled by a wide variety of different pollutants, e.g., mercury, chemical waste, etc.

BRIEF DESCRIPTION OF THE DRAWINGS

Various other objects, features, and attendant advantages of the present invention will be more fully appreciated as the same becomes better understood when considered in conjunction with the accompanying drawings in which like reference characters designate the same or similar parts throughout the several views. The figures are schematic flow charts of a facility for performing the process. In this connection, the individual figures relate to various parts of the facility of the same installation immediately adjoining one another.

DETAILED DESCRIPTION

The description of the figures is provided in the context of a non-limitative, practical example, wherein soil polluted with a pollutant mixture of mineral oil hydrocarbons, polyaromatic hydrocarbons, polychlorinated biphenyls, chlorinated hydrocarbons, fluorinated hydrocarbons and benzene, toluene, xylene aromatics (BTX) is to be decontaminated.

Figure 1:
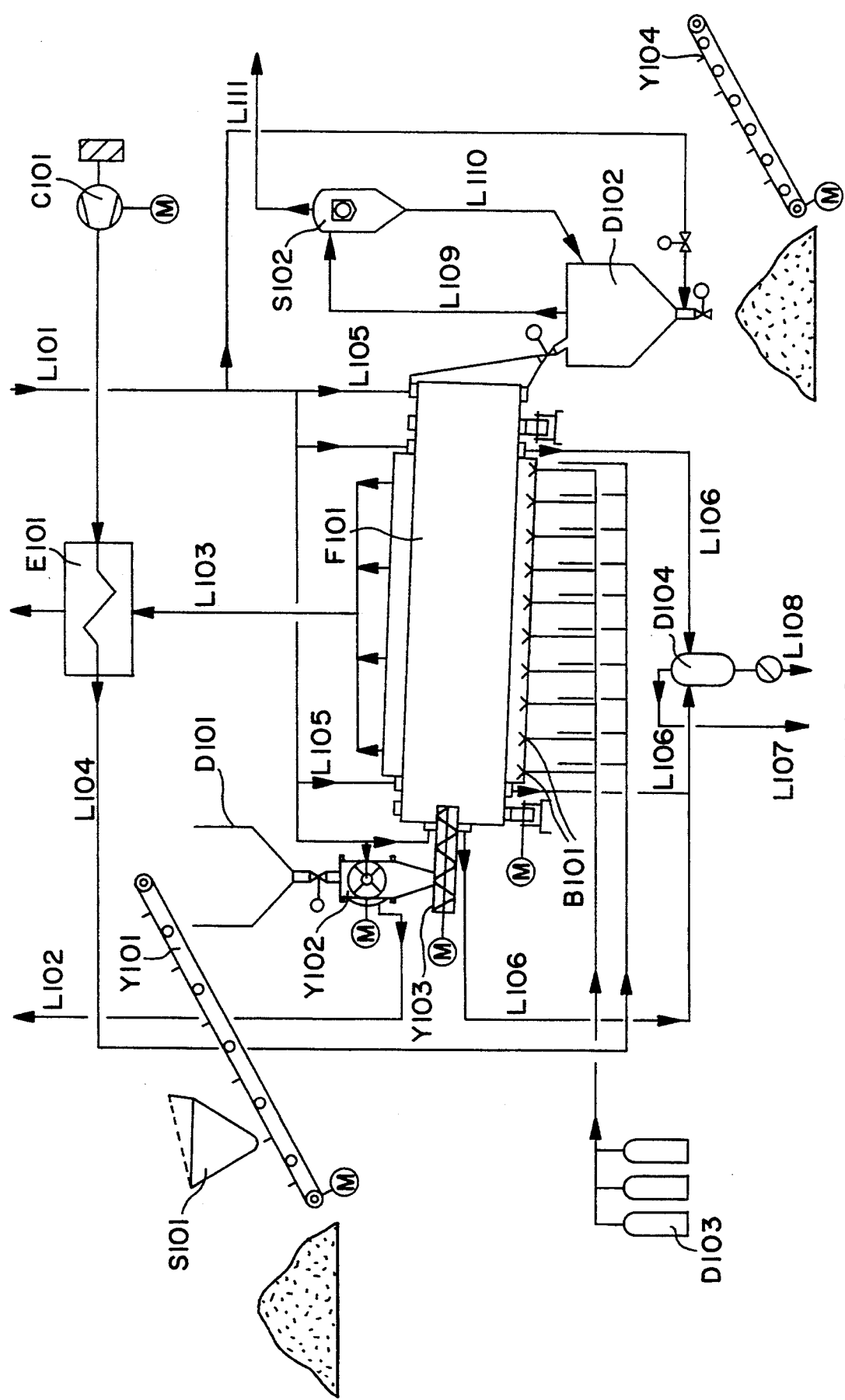
FIG. 1 shows a section of the facility for soil drying and soil purification.

As shown in FIG. 1, the excavated soil is fed via a soil sifter S 101 to a conveyor belt Y 101 and transported into a receiver vessel D 101. In the latter, the residual intergranular oxygen content can be removed from the soil by purging with a gas, e.g., nitrogen. From there, the soil passes via a rotary feeder Y 102 into a screw conveyor Y 103 The rotary feeder Y 102 is sealed with a purging medium, preferably nitrogen or low pressure steam obtained from conduit L 101 from the section of the facility shown in FIG. 3. The used-up, low pressure steam is conducted via conduit L 102 into the section of the facility illustrated in FIG. 2.

The contaminated soil is transported by means of the screw conveyor Y 103 into the rotary tubular furnace F F 101. The rotary furnace 101 is heated from the outside by propane burners B 101 (fed by propane bottles D 103) to tube wall temperatures of about 350°–650° C. During this step, the ground moisture in the soil treated in the rotary furnace F 101 is thereby vaporized. The steam acts as a desorption medium and takes up the pollutants from the soil with the formation of a gaseous pollutant stream. The flue gas produced by the propane burners B 101 is exhausted from the furnace wall via conduit L 103 and passed through a heat exchanger E 101. In this way, combustion air is preheated against the resultant flue gas stream. The combustion air is taken in by an air blower C 101 and fed via conduit L 104 to the propane burners B 101.

Figure 3:
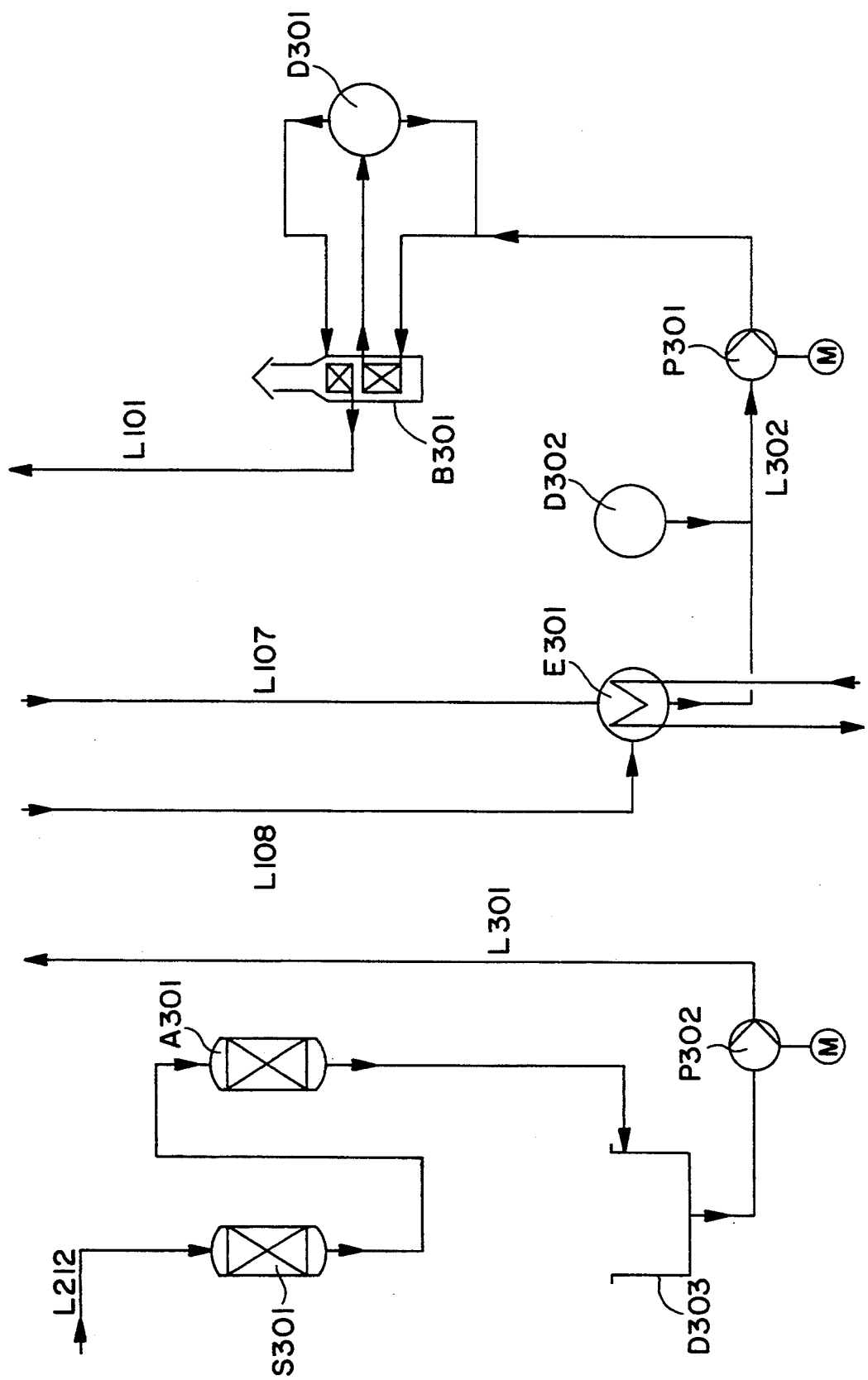
FIG. 3 shows a section of the facility of water purification and steam generation.

The gaskets of rotary furnace F 101 are maintained at an elevated pressure of about 1.1 bar abs. by introducing low pressure steam from the section of the facility shown in FIG. 3 via conduits L 101 and L 105. The increased internal pressure in the rotary furnace F 101 prevents the penetration of atmospheric oxygen. Any obtained condensate is withdrawn via conduit L 106 and passed into a condensate tank D 104. The thus-evolving steam and condensate are introduced separately via conduits L 107 and L 108 to the section of the facility shown in FIG. 3.

The thermally treated soil passes into a discharge tank D 102. In the latter, the gaseous pollutant stream is separated from the soil and fed via conduit L 109 into a cyclone separator S 102. In the cyclone separator S 102, any solids entrained by the gaseous pollutant stream are separated and recycled via conduit L 110 into the discharge tank D 102.

The decontaminated soil is discharged from the discharge tank D 102 and, after cooling, can be loaded onto trucks by means of a conveyor belt Y 104 for return to the excavation site.

Figure 2:
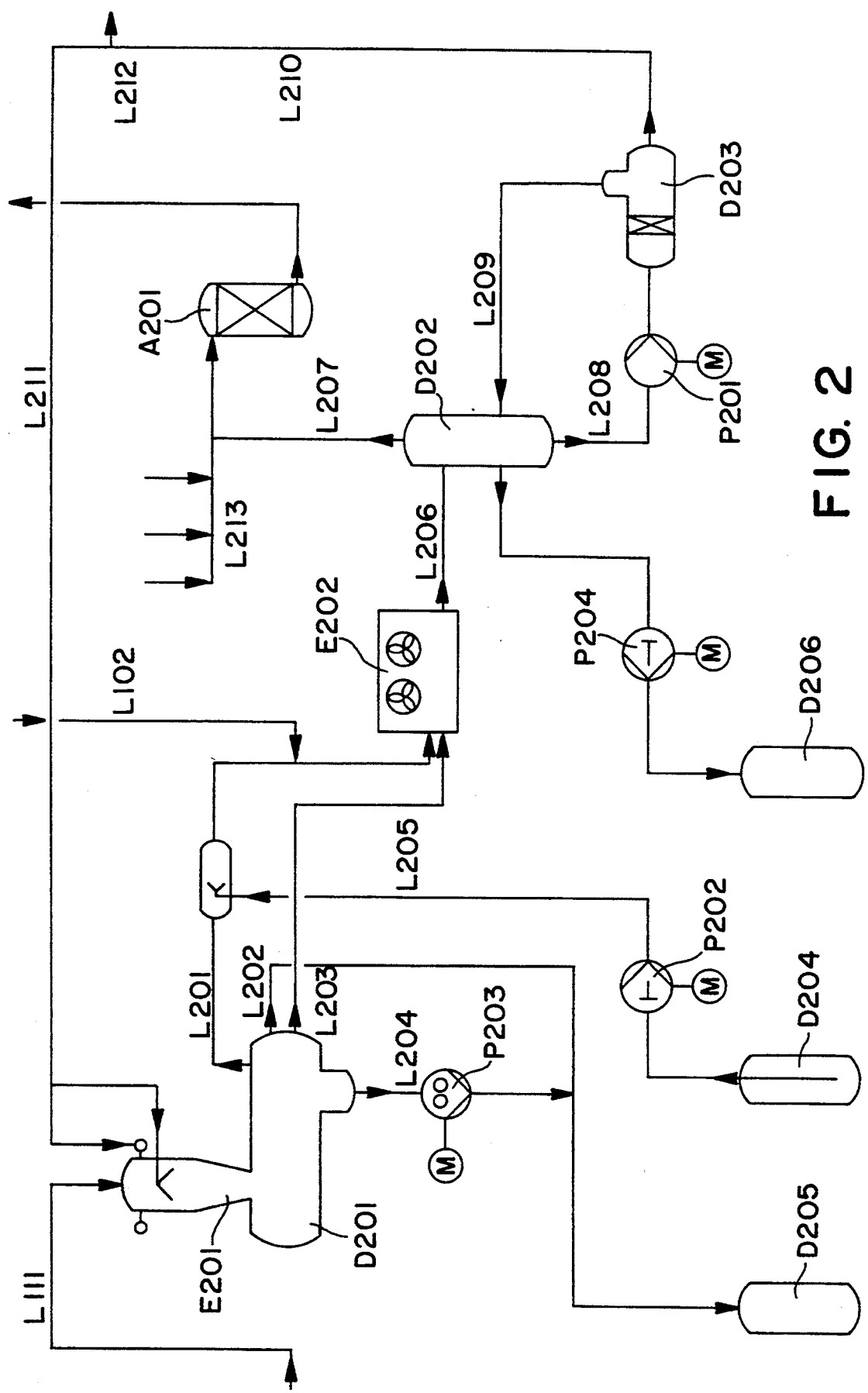
FIG. 2 shows a section of the facility for exhaust steam condensation with pollutant separation.

The gaseous pollutant stream is transferred for further processing via conduit L 111 into the facility section illustrated in FIG. 2.

FIG. 2 shows the section of the facility wherein the gaseous pollutant stream is condensed, and the pollutants are separated. The gaseous stream of pollutants passes via conduit L 111 into a quench cooler E 201, wherein the gaseous pollutant stream is cooled by means of a water scrub at about 100° C. After the scrubbing step, phase separation is carried out in a separating tank D 201. The individual phases are discharged separately via conduits L 201, L 202, L 203, and L 204 and, in each case, processed in a controlled manner. The heavy organic phase and the solids are discharged by way of conduit L 204. Via conduit L 202, the light organic phase is introduced into this pollutant stream. The resultant water is removed via conduit L 203. The gases that cannot be condensed are withdrawn via conduit L 201. A pollutant pump P 203 is inserted in conduit L 204. The pollutants in conduits L 202 and L 204 are collected in a containing D 205.

The residual gaseous phase is fed via conduit L 201 to an air cooler E 202 for further cooling. Since cooling in air cooler E 202 is possible only if precipitation of solids is prevented, an organic solvent is sprayed into the gaseous stream in conduit L 201 from a solvent tank D 204 via a pump P 202 and by way of conduit L 205. As a result, organic solids are dissolved in the solvent, precluding clogging of heat exchange surfaces in the air cooler E 202.

Via conduit L 102, low pressure steam from the facility section shown in FIG. 1 is introduced into the gaseous stream.

Also, the aqueous phase present in conduit L 203 is conducted via the air cooler E 202.

The thus-cooled pollutant stream is introduced via conduit L 206 into a separating tank D 202. The process is performed while pressure-equalized with the atmosphere. All pollutants and the steam condense at ambient temperature. For control purposes, an incondensable, inert gas stream (e.g., $N_2$) is discontinuously fed via conduit L 213. The subsequently arranged active carbon filter A 201 serves as a safety filter against improper emissions if operational difficulties are encountered.

The aqueous phase obtained is passed on via conduit L 208 and a water circulation pump P 201 to a pollution-coalescing unit D 203. The resultant liquid pollutant phase is discharged via conduit L 209 by means of the pump P 204 and collected in a drum D 206.

A portion of the aqueous phase is recycled in part via conduits L 210 and L 211 into the quench cooler E 201 for use as wash water. Another part is transferred via conduits L 210 and L 212 into the section of the facility shown in FIG. 3.

FIG. 3 depicts the water purification and steam generation sections of the plant. The stream of water in conduit L 212 is conducted through a dirt filter S 301 and an active carbon filter A 301. The dirt filter S 301 contains decontaminated soil from the rotary furnace F 101 as the filter material. Once the filter material is loaded with pollutants, it is returned into the rotary furnace F 101 for regeneration. The purified water is introduced into a wastewater tank D 303. From there, the water is discharged by means of a wastewater pump P 302 and removed via conduit L 301.

The condensate withdrawn via conduit L 108 from the section of the facility shown in FIG. 1 and the low pressure steam removed via conduit L 107 are fed to a low pressure condenser E 301, cooled with cooling water that can be withdrawn, for example, from conduit L 301. The condensate is introduced into a steam generator B 301 via conduit L 301 and a condensate pump P 301. The container D 302 is a receiver tank for water processed for steam generation. This container serves as a buffer and compensates for losses or excess production of processed water. In container D 301, the thus-produced steam is separated from the circulating feed water. The exhaust steam is fed to a superheating surface in steam generator B 301. The resultant low pressure steam is finally recycled via conduit L 101 into the section of the facility shown in FIG. 1.

Without further elaboration, it is believed that one skilled in the art can, using the preceding description, utilize the present invention to its fullest extent.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited herein, and of corresponding German P 41 24 277.7, filed Jul. 22, 1991, are hereby incorporated by reference.

What is claimed is:

1. A process for the decontamination of an excavated soil containing soil pollutants and water moisture, comprising the steps of: passing the excavated soil to a thermal treatment zone, heating the soil in the absence of oxygen and under superatmospheric pressure by indirect heat exchange to a temperature not higher than 650° C. under sufficient time-temperature conditions, such that the water moisture in the soil is vaporized to form steam, contacting a desorption medium comprising said steam with said soil in the absence of oxygen, and under sufficient time-temperature conditions to desorb the soil pollutants from the soil, cooling the desorption medium containing the soil pollutants in a scrubbing step, separating the cooled and scrubbed desorption medium into individual phases at least one phase being a gaseous phase, dissolving any precipitating solids in the gaseous phase in a solvent and cooling the gaseous phase.

2. A process according to claim 1, wherein the desorption medium acts on the soil for a time period of about 0.5–1 hour.

3. A process according to claim 1, wherein during said heating or desorbing step, an inert gas is further added to the desorption medium.

4. A process according to claim 1, further comprising injecting supplemental water or steam into the thermal treatment.

5. A process according to claim 1, wherein an aqueous phase is obtained after phase separation, and said aqueous phase is filtered through a filter containing filter media.

6. A process according to claim 5, wherein resultant decontaminated soil is utilized as filter media.

7. A process according to claim 5, wherein resultant laden filter media is thermally treated together with the contaminated soil.

8. A process according to claim 1, wherein said excavated soil is purged with a gas to remove oxygen prior to the heating step.

9. A process according to claim 1, wherein the temperature in the thermal treatment zone is 200°–650° C.

10. A process according to claim 1, wherein the temperature in the thermal treatment zone is 350°–550° C., and the superatmospheric pressure is not more than 2 bars absolute.

11. A process for the decontamination of an excavated soil containing soil pollutants and water moisture comprising the steps of: passing the excavated soil to a thermal treatment zone having at least two stages, in a first stage, heating the soil in the absence of oxygen and under superatmospheric pressure by indirect heat exchange to a temperature not higher than 650° C. under sufficient time-temperature conditions such that the water moisture in the soil is vaporized to form steam, in a second stage, desorbing the soil pollutants from the soil by passing a desorption medium comprising the steam formed in the first stage through the soil, in the absence of oxygen, wherein the desorption medium is present in the second stage for a time period of 0.5–1 hour, and under sufficient time-temperature conditions to desorb the soil pollutants from the excavated soil, cooling the desorption medium containing the soil pollutants in a scrubbing step, separating the cooled and scrubbed desorption medium into individual phases at least one phase being a gaseous phase, dissolving any precipitating solids in the gaseous in a solvent and cooling the gaseous phase.

* * * * *